- No. 743,664.

Patented November 10, 1903.

UNITED STATES PATENT OFFICE.

ROBERT E. SCHMIDT, OF ELBERFELD, GERMANY, ASSIGNOR TO FARBENFABRIKEN OF ELBERFELD CO., OF NEW YORK, N. Y., A CORPORATION OF NEW YORK.

ANTHRAQUINONE-ALPHA-SULFONIC ACID.

SPECIFICATION forming part of Letters Patent No. 743,664, dated November 10, 1903.

Application filed June 26, 1903. Serial No. 163,159. (No specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in Anthraquinone-Alpha-Sulfonic Acid; and I hereby declare the following to be a clear and exact description of my invention.

My invention relates to the manufacture of the hitherto unknown anthraquinone-alpha-sulfonic acid having the formula:

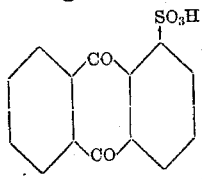

My new process for producing this body consists in treating anthraquinone with concentrated sulfuric acid or fuming sulfuric acid of low percentage of $SO_3$ in the presence of mercury or mercury compounds—such as mercurous or mercuric salts, mercurous or mercuric oxid, or the like. For this purpose a very small quantity of mercury or of mercury compounds is sufficient, the action of these bodies being only a so-called "catalytic" one.

In order to avoid the production of disulfonic acids, it is profitable to carry out the process in such a manner that anthraquinone is only partly attacked by the sulfuric acid, and the other part rests unattacked.

In order to carry out my invention practically, I can proceed as follows, the parts being by weight: A mixture of fifty parts of anthraquinone, sixty parts of fuming sulfuric acid, (twenty per cent. $SO_3$,) and four-tenths parts of pulverized mercurous sulfate ($Hg_2SO_4$) is heated to 150° centigrade for about three-quarters of an hour while stirring. The melt is then diluted with seven hundred parts of water, unattacked anthraquinone is filtered off, and the filtered liquid heated up to from 80° to 95° centigrade is mixed with thirty parts of a cold concentrated solution of potassium chlorid. The sparingly-soluble potassium salt of anthraquinone-alpha-sulfonic acid separates. After cooling it is filtered off, washed with cold water, and dried.

The new anthraquinone-alpha-sulfonic acid forms a very characteristic potassium salt, representing straw-yellow brilliant leaflets soluble with difficulty in water. The nearly colorless aqueous solution of the potassium salt acidulated with hydrochloric acid turns into an intense yellow by the addition of zinc-dust. On being heated with ammonia to 180° centigrade the sulfonic acid or its salts are converted into the known alpha-amido-anthraquinone. When heated with a watery solution of monomethylamin to 170° to 180° centigrade, alpha-methylamidoanthraquinone results.

Having now described my invention and in what manner the same is to be performed, what I claim as new, and desire to secure by Letters Patent, is—

The herein-described new anthraquinone-alpha-sulfonic acid, which in the shape of the potassium salt forms straw-yellow brilliant leaflets soluble with difficulty in water; its aqueous solution acidulated with hydrochloric acid turning into an intense yellow by the addition of zinc-dust; being transformed into alpha-amidoanthraquinone when heated with ammonia to 180° centigrade, and being transformed into alpha-methylamidoanthraquinone upon treatment with an aqueous solution of methylamin at 170° to 180° centigrade, substantially as described.

In testimony whereof I have signed my name in the presence of two subscribing witnesses.

ROBERT E. SCHMIDT.

Witnesses:
OTTO KÖNIG,
J. A. RITTERSHAUS.